(12) United States Patent
Mori et al.

(10) Patent No.: US 7,562,637 B2
(45) Date of Patent: Jul. 21, 2009

(54) COMBINATION METER

(75) Inventors: Kouji Mori, Shizuoka (JP); Masahiko Mio, Shizuoka (JP); Tatsuya Saito, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/806,892

(22) Filed: Jun. 5, 2007

(65) Prior Publication Data

US 2008/0000410 A1    Jan. 3, 2008

(30) Foreign Application Priority Data

Jun. 28, 2006  (JP)  .............................. 2006-177846

(51) Int. Cl.
*G01D 7/04* (2006.01)
(52) U.S. Cl. .................. 116/300; 116/62.4; 116/DIG. 6
(58) Field of Classification Search ................. 116/300, 116/301, 62.1, 62.4, 286, 287, 288, DIG. 6, 116/DIG. 36; 340/461, 488
See application file for complete search history.

(56) References Cited

U.S. PATENT DOCUMENTS

| 1,296,439 | A | * | 3/1919 | Sperry | .................... | 340/870.15 |
|---|---|---|---|---|---|---|
| 2,882,855 | A | * | 4/1959 | Anderson | .................... | 116/301 |
| 2,991,752 | A | * | 7/1961 | Amos | .......................... | 116/329 |
| 3,653,257 | A | * | 4/1972 | Brindley et al. | ........ | 73/862.041 |
| 3,947,814 | A | * | 3/1976 | Allen | .......................... | 340/441 |
| 5,553,480 | A | * | 9/1996 | Rose | .......................... | 73/1.79 |
| 6,178,917 | B1 | * | 1/2001 | Jansa | .......................... | 116/286 |
| 6,189,480 | B1 | * | 2/2001 | Staley et al. | ................. | 116/288 |
| 6,561,123 | B2 | * | 5/2003 | Kallinke et al. | ............. | 116/288 |
| 7,066,630 | B1 | * | 6/2006 | Venkatram | .................. | 362/489 |

FOREIGN PATENT DOCUMENTS

| JP | 56027611 | A | * | 3/1981 |
|---|---|---|---|---|
| JP | 08105759 | A | * | 4/1996 |
| JP | 08159815 | A | * | 6/1996 |
| JP | 2001-59751 | | | 3/2001 |
| JP | 2004219210 | A | * | 8/2004 |
| JP | 2007212409 | A | * | 8/2007 |
| JP | 2008014854 | A | * | 1/2008 |
| WO | WO 2004048901 | A1 | * | 6/2004 |
| WO | WO 2007082260 | A2 | * | 7/2007 |

* cited by examiner

*Primary Examiner*—R. A. Smith
(74) *Attorney, Agent, or Firm*—Kratz, Quintos & Hanson, LLP

(57) ABSTRACT

The present invention is to provide a combination meter having a close arrangement of a plurality of drive axles of pointers so as to save a space thereof and provide a good design thereof. The combination meter includes a speedometer and a tachometer. A speedometer dial and a tachometer dial are disposed on the circumference of one circle. The pointers each include a deadweight holder to hold a deadweight. The deadweight holders are separately overlapped each other in directions of the drive axles. One of the drive axles is disposed on the center of the circle and the other is disposed close to the center.

1 Claim, 6 Drawing Sheets

COMBINATION METER

BACKGROUND OF THE INVENTION

1. Field of the Invention

The present invention relates to a combination meter having a plurality of dials for indicating measured values with a plurality of pointers. The combination meter is mounted to a vehicle such as a motor vehicle, a vessel, or the like.

2. Description of Related Art

A vehicle such as a motor vehicle or a vessel is mounted with a combination meter displaying a plurality of informations measured with a variety of measuring units to a driver.

FIG. 6 shows a conventional combination meter of a motor vehicle (see JP-2001-059751,A). The combination meter 100 includes a speedometer 101 to indicate a speed of the motor vehicle, a tachometer 102 to indicate an engine speed, a fuel gauge 103 to indicate a remaining amount of a fuel, and a temperature gauge 104 to indicate a temperature of a coolant of the engine.

The respective meters 101-104 include dials 101a-104a disposed on a dial plate 105, pointers 101b-104b to point the dials 101a-104a, and movements to rotate the pointers 101b-104b in response to the measured values, respectively. The movements include drive axles, which penetrate the dial plate 105 and are attached to the pointers 101b-104b, and driver units disposed behind the dial plate 105.

In the conventional combination meter 100, the dial 101a of the speedometer 101 is circularly disposed about an end portion 101c of the drive axle of the pointer 101b. The speedometer 101 has an inaccessible portion, or dead space N on a circumference of the dial 101a, where the pointer 101b is inaccessible.

The tachometer 102 can be disposed on the inaccessible portion N of the speedometer 101 so as to effectively use the dead space and provide a novel design. The close arrangement of the two kinds of the meters 101, 102 does not provide a good appearance, resulting to a low visibility to the driver.

The dial 102a of the tachometer 102 can be disposed on the inaccessible portion of the speedometer 101. The pointers 101b and 102b are attached with deadweights to adjust positions of the gravity thereof. Since the attachment of the respective deadweights needs a certain amount of space, it is difficult to closely dispose the respective drive axles of the end portion 101c and end portion 102c. The drive axles of the meters 101 and 102 can not be thus disposed on the center or close to the center of the dials 101a and 102a. The separate arrangement of one drive axle from the center of the dials 101a and 102a provides an uncomfortable appearance.

SUMMARY OF THE INVENTION

An object of the present invention is to provide a combination meter having a close arrangement of a plurality of drive axles of pointers so as to save a space thereof and provide a good design thereof.

According to a first aspect of the present invention, a combination meter includes: a plurality of dials for indicating a condition of a vehicle; and a plurality of pointers rotating in response to measured values and attached to drive axles of movements, the pointers each including a base end portion attached to the associated drive axle and rotating therewith as the center of rotation of the associated pointer, a needle outwardly extending from the associated base end portion for pointing the associated dial, and a deadweight holder extending opposite to the associated needle from the associated base end portion for holding a deadweight, wherein the deadweight holders are partly overlapped each other in directions of the drive axles.

Preferably, the plurality of dials are disposed on the circumference of one circle.

DETAILED DESCRIPTION OF THE PREFERRED EMBODIMENTS

A combination meter according to an embodiment of the present invention is explained by referring to FIGS. 1-5. The combination meter 1 is mounted on a vehicle such as a motor vehicle to indicate a various of informations to a driver.

Figure 1:
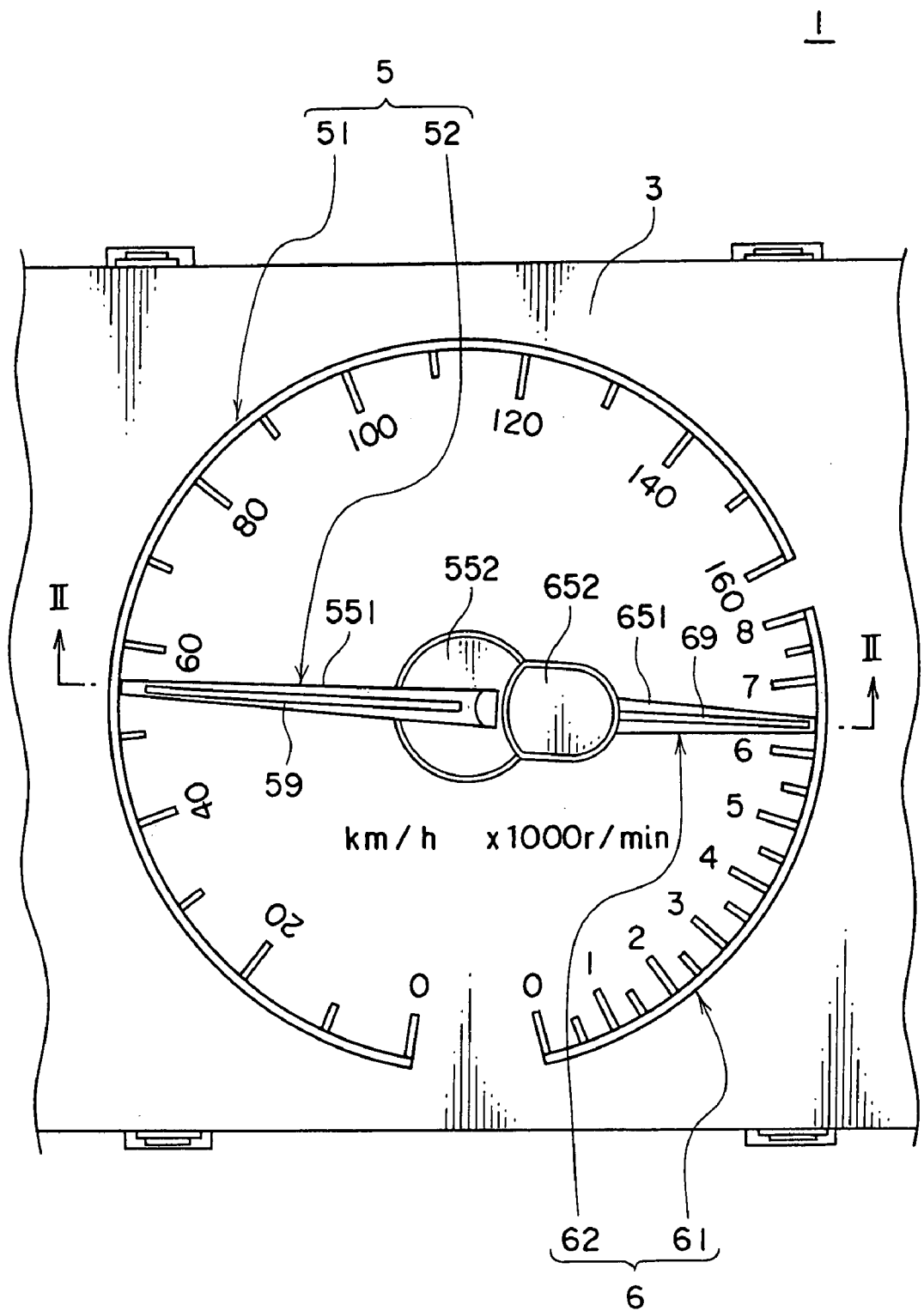
FIG. 1 is a plan view showing an embodiment of a combination meter for a vehicle of the present invention.
Figure 2:
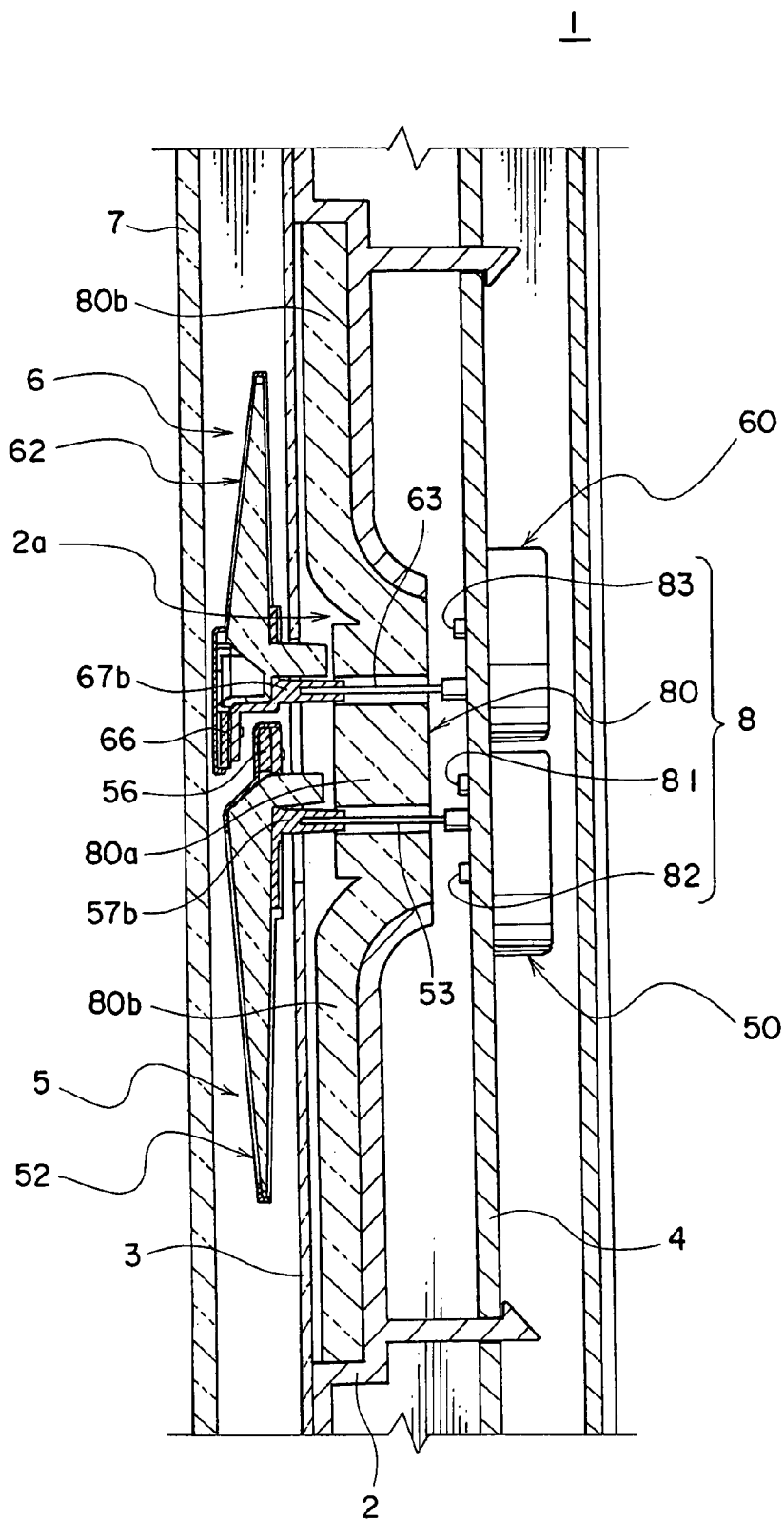
FIG. 2 is a sectional view taken along a line II-II of FIG. 1.
Figure 3:
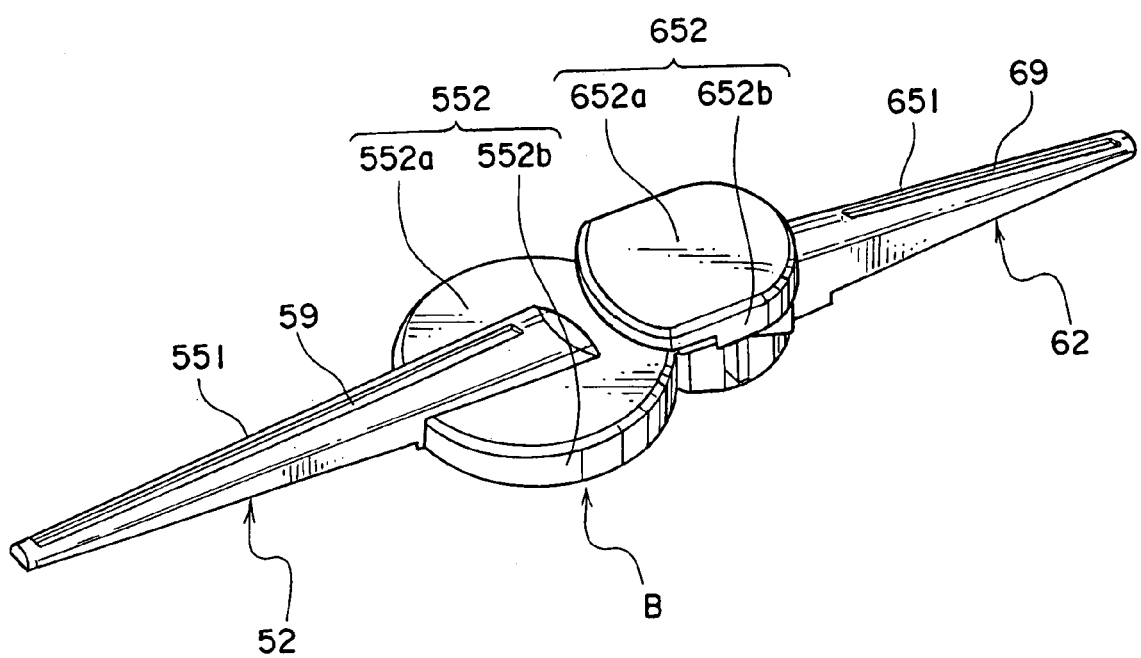
FIG. 3 is a perspective view showing a pointer of a speedometer and a pointer of a tachometer of the combination meter of FIG. 1.

As shown in FIGS. 1 and 2, the combination meter 1 includes a casing 2, a dial plate 3, a printed board 4, a plurality of meters such as a speedometer 5, a tachometer 6, and the like, a cover plate to expose only the meters, a transparent cover 7 attached to the casing 2 to avoid entrance of dust into the combination meter 1, and an illuminant unit 8.

The casing 2 is formed in a box shape and has an opening 2a facing to the driver. The casing 2 receives the illuminant unit 8 and movements 50 and 60. The printed board 4 is disposed on the right side of the casing 2 as shown in FIG. 2. The printed board 4 is flexible and mounted with electronic parts such as a microcomputer to control the illuminant unit 8.

The dial plate 3 is attached to the casing 2 such that the dial plate 3 covers the opening 2a of the casing 2. The dial plate 3 is more closely located to the driver than the printed board 4. The dial plate 3 includes a speedometer dial 51, a tachometer dial 61, and other characters, which are printed on the dial plate 3. The light of the illuminant unit 8 passes through the dial plate 3 except the printed characters.

The meters include the speedometer 5, the tachometer 6, a fuel gauge (not shown), and a temperature gauge to indicate a temperature of a coolant of an engine (not shown).

The speedometer 5 and tachometer 6 have the movements 50, 60, pointers 52, 62, and the dials 51, 61, respectively.

The movements 50 and 60 are attached to the printed board 4 and driven with signals from a speedometer sensor and a tachometer sensor (both not shown), respectively. The movements 50 and 60 have drive axles 53 and 63 rotating in response to the measured values detected by the sensors.

The pointers 52, 62 of FIGS. 1-5 are driven by the movements 50, 60 and point out the dials 51, 61 on the dial plate 3.

Figure 5:
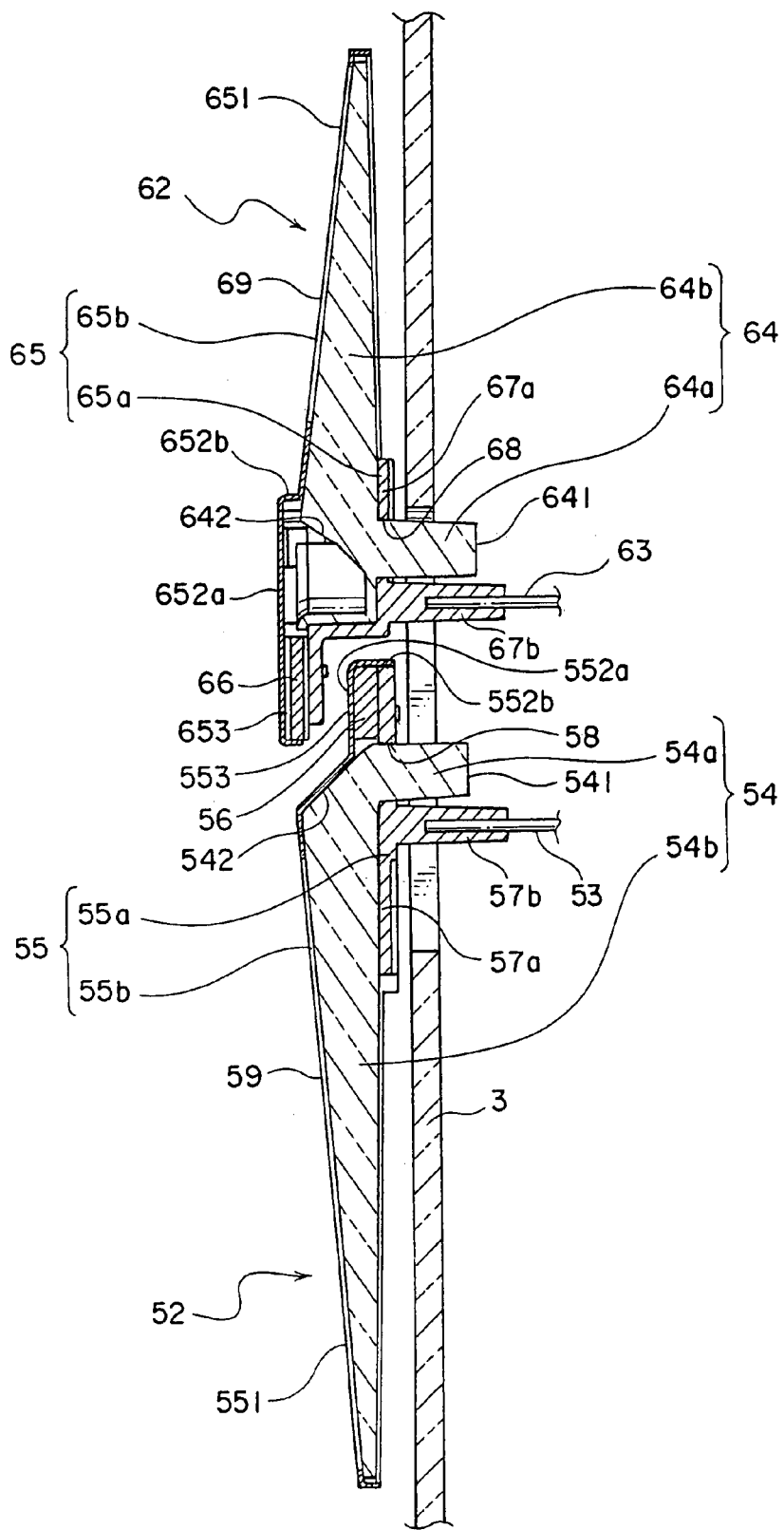
FIG. 5 is an expanded sectional view of an essential part of the combination meter of FIG. 2.
Figure 6:
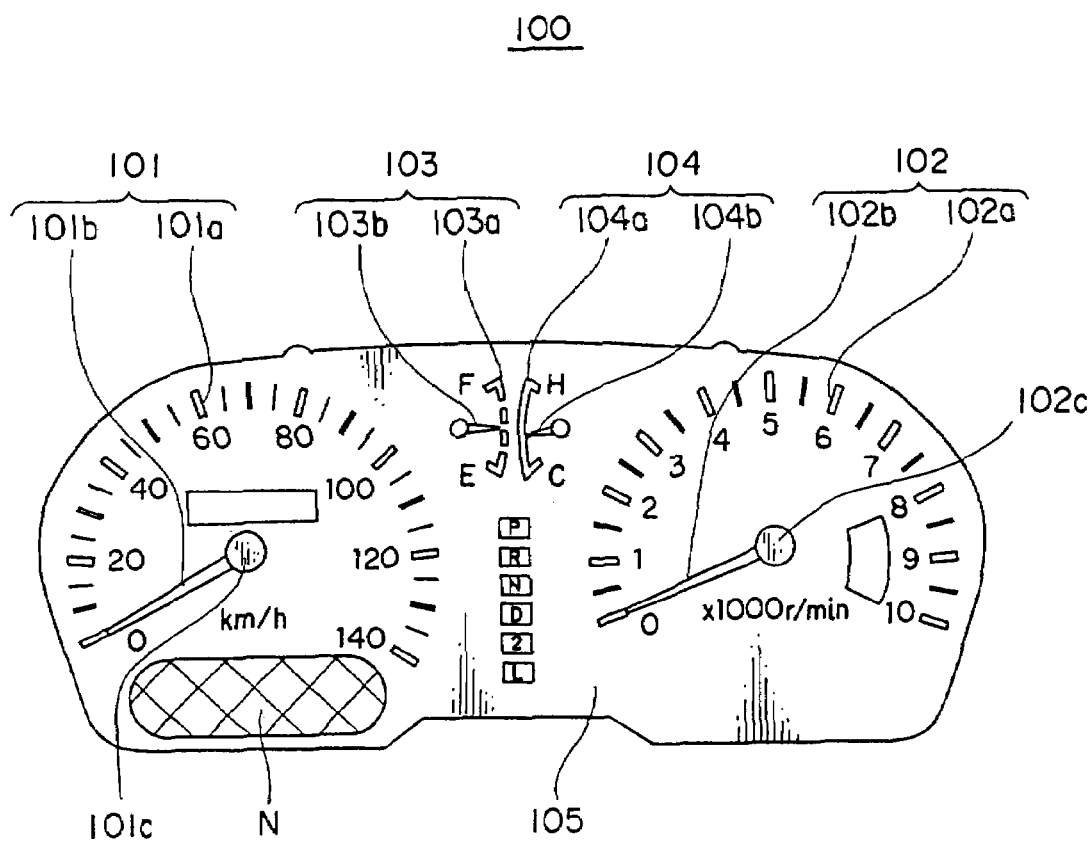
FIG. 6 is a plan view of a conventional combination meter.

Referring to FIG. 5, the pointers 52, 62 include pointer main bodies 54, 64 made of a translucent material such as acrylate resin, covers 55, 65 made of a nontransparent material to cover the pointer main bodies 54, 64, and deadweights 56, 66, respectively.

The pointer main bodies 54, 64 include light receivers 54a, 64a disposed adjacent to the drive axles 53, 63, and needles 54b, 64b radially extending from the light receivers 54a, 64a, respectively.

Figure 4:
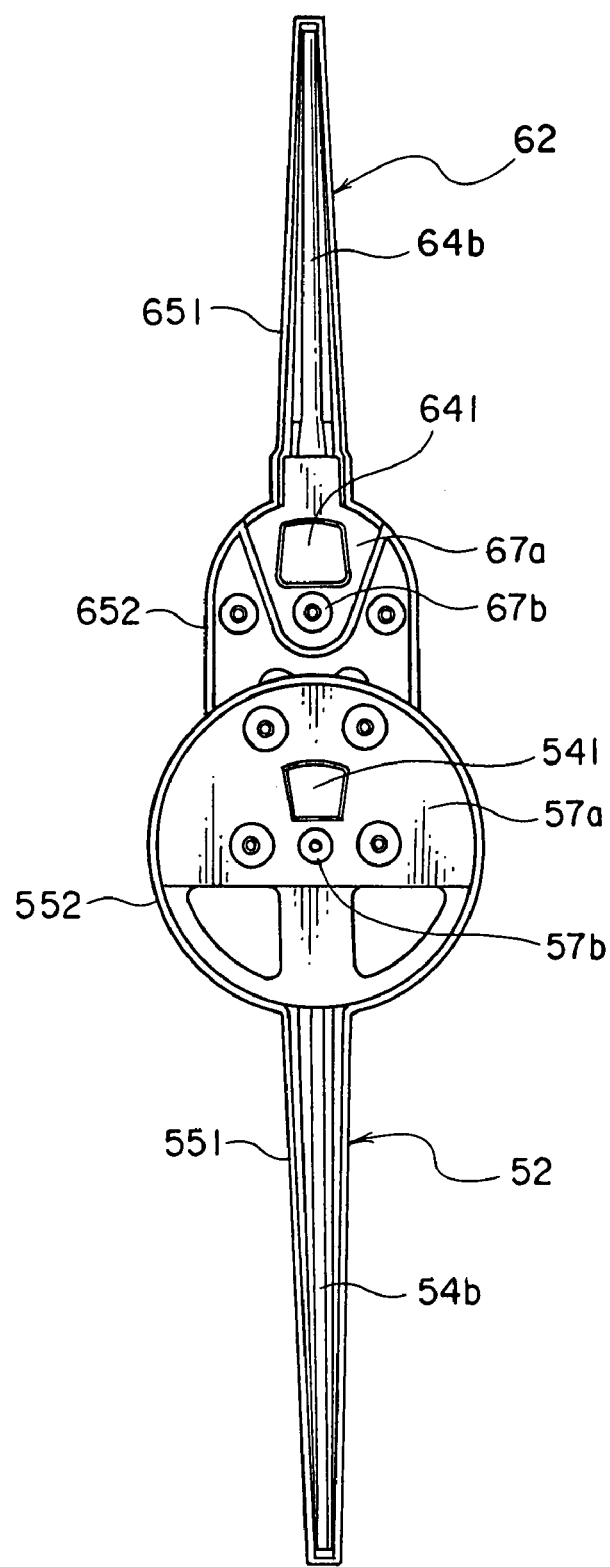
FIG. 4 is a bottom view of FIG. 3.

As shown in FIGS. 4 and 5, the light receivers 54a, 64a include light receiver surfaces 541, 641 and reflecting surfaces 542, 642. The light receiver surfaces 541, 641 are formed in a fun shape in a plan view and receive light emitted from LEDs 81-83 via a pointer light guide portion 80a. The reflecting surfaces 542, 642 reflect the light from the light receiving surfaces 541, 641 toward end portions of the needles 54b, 64b. The light receiver surfaces 541, 641 are opposed to the light guide portion 80a. The reflecting surfaces 542, 642 are opposite to the light receiver surfaces 541, 641 and gradually beveled toward the drive axles 53, 63 and the dial plate 3.

The covers 55, 65 include cover lower portions 55a, 65a and cover upper portions 55b, 65b, respectively. The cover lower portions 55a, 65a are connected with the drive axles 53, 63 to rotatably support the light receivers 54a, 64a. The cover upper portions 55b, 65b cover the pointer main bodies 54, 64 and make the cover lower portions 55a, 65a fit thereinside.

The cover lower portions 55a, 65a have circular disks 57a, 67a and pipes 57b, 67b. The circular disks 57a, 67a have through-holes 58, 68 to accept the light receivers 54a, 64a, respectively. The pipes 57b, 67b extend from the circular disks 57a, 67a to the dial plate 3. The pipes 57b, 67b accept the drive axles 53, 63 and affect as the center of the pointers 52, 62 and referred to "base end portion".

The cover upper portions 55b, 65b include pyramid portions 551, 651 and disks 552, 652. The pyramid portions 551, 651 are formed in outer shapes of the needles 54b, 64b and cover them, respectively. The disks 552, 652 are connected to end portions of the pyramid portions 551, 651 in the vicinity of the drive axles 53, 63. The disks 552, 652 include substantially circular upper walls 552a, 652a and tube shaped peripheral walls 552b, 652b. The upper walls 552a, 652a are opposed to the disks 57a, 67a of the cover lower portions 55a, 65a. The peripheral walls 552b, 652b downwardly extend from the upper walls 552a, 652a. The circular disks 57a, 67a of the cover lower portions 55a, 65a are fitted inside the peripheral walls 552b, 652b.

The pyramid portions 551, 651 have slits 59, 69 facing the driver, respectively. The lights emitted from the LEDs 81-83 enter into the needles 54b, 64b and come out of the slits 59, 69 to provide the driver the visibility of the pointers 52, 62.

The disks 552, 652 have deadweight holders 553, 653. The deadweight holders 553, 653 are fitted with the cover upper and lower portions 55b, 65b; 55a, 65a, respectively. The pointer main bodies 54, 64 are interposed between the cover upper and lower portions 55b, 65b; 55a, 65a. The deadweight holders 553, 653 are disposed opposite to the pipes 57b, 67b about the through-holes 58, 68. The deadweight holders 553, 653 are disposed opposite to the needles 54b, 64b about the pipes 57b, 67b. The deadweights 56, 66 are then held between the deadweight holders 553, 653 and the disks 57a, 67a of the cover lower portions 55a, 65a. The deadweights 56, 66 are balanced with the needles 54b, 64b outwardly extending from the pipes 57b, 67b to adjust the position of gravity in a longitudinal direction of the pointers 52, 62, respectively.

Referring to FIG. 5, the deadweight holder 653 of the pointer 62 of the tachometer 6 is overlapped with the deadweight holder 553 of the pointer 52 of the speedometer 5 along the axial directions of the drive axles 53, 63. The deadweight holders 553, 653 are overlapped separately each other so that the pointers 52, 62 do not contact each other when they rotate.

Accordingly, as shown in FIG. 1, the speedometer dial 51 and the tachometer dial 61 can be arranged on a circumference of one circle. The center of rotation of the pointer 52 of the speedometer 5, or the pipe 57b, is positioned to the center of the one circle. The center of rotation of the pointer 62 of the tachometer 6, or the pipe 67b, is positioned close to the center of the circle. This configuration provides an appearance as though the pointers 52, 62 coaxially rotate.

The deadweight holders 553, 653 are overlapped each other along the axial directions of the drive axles 53, 63, so that the drive axles 53, 63 can be disposed closely each other.

The illuminant unit 8 includes the LEDs (Light Emitting Diode) 81-83 disposed on the printed board 4 and facing on the driver, and a light guide plate 80 disposed between the LEDs 81-83 and the dial plate 3. The light guide plate 80 includes the pointer light guide portion 80a with a cylindrical shape and dial plate light guide portions 80b disposed on an outer wall. The pointer light guide portion 80a guides the lights of the LEDs 81-83 to the light receiver surfaces 541, 641 to illuminate the pointers 52, 62. The pointer light guide portions 80a has the through-holes to pass through the drive axles 53, 63 toward the dial plate 3. The dial plate light guide portions 80b guide the lights of the LEDs 81-83 to the dials 51, 61 of the dial plate 3 to illuminate the dials 51, 61.

The embodiment discloses that the speedometer dial 51 and the tachometer dial 61 are arranged on the circumference of the one circle, and that the deadweight holders 553, 653 are overlapped each other to make the drive axles 53, 63 closely approach each other. This arrangement improves the design of the appearance and novelty as though the pointers 52, 62 of the meters 5, 6 rotate coaxially. Since the tachometer 6 is disposed on the inaccessible portion of the pointer 52 of the speedometer 5, the space of the dial plate 3 is saved.

It is appreciated that dials other than the speedometer dial 51 and the tachometer dial 61 are disposed. It is appreciated that three different dials are disposed. It is appreciated that it is not necessary to dispose the dials on the same circumference of the one circle. It is appreciated that a dial having a radius or curvature different from the speedometer dial 51 is disposed on the inaccessible portion. It is appreciated that any modification and alteration of the combination meter of the present invention is allowed as long as the deadweight holders of the meters are overlapped each other along the directions of the drive axles. It is appreciated that the deadweight holders are partly overlapped each other along the directions of the drive axles.

The above embodiments are only exemplary and not limited thereto. Any modification and alteration are within the spirit and scope of the present invention.

What is claimed is:

1. A combination meter comprising:
    a plurality of dials disposed on and spaced circumferentially about one circle for indicating a condition of a vehicle; and
    a plurality of pointers rotating in response to measured values and attached to separate and spaced drive axles, the axles having different axes of rotation of movements, the pointers each including
        a base end portion attached to the associated drive axle having a portion extending coaxially with the associated drive axle and rotating therewith as the center of rotation of the associated pointer,
        a needle outwardly extending from the associated base end portion for pointing to the associated dial, and
        a deadweight holder extending opposite to the associated needle from the associated base end portion for holding a deadweight,
        wherein the deadweight holders partly overlap each other in a direction of the portion of the base end portion extending coaxially with the drive axles.

* * * * *